April 13, 1954   H. J. NICHOLS   2,675,084
CONTROLLABLE REVERSIBLE PITCH PROPELLER
Filed Aug. 26, 1947   2 Sheets-Sheet 1
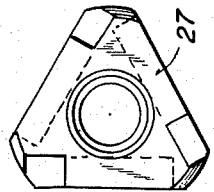
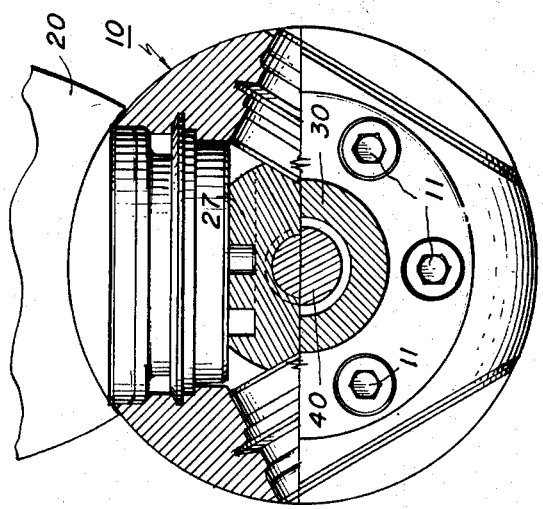
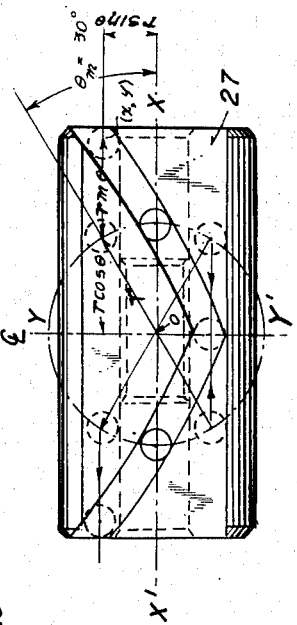
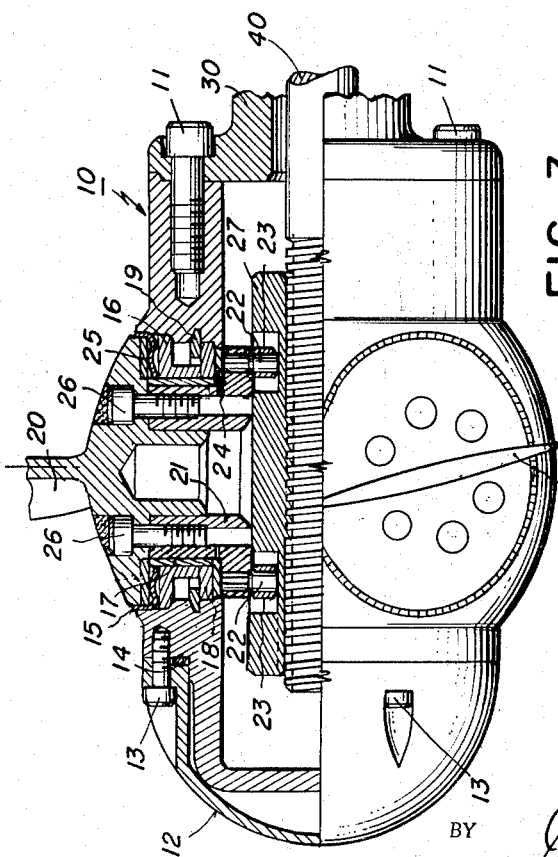
INVENTOR
HARRY J. NICHOLS,
BY
ATTORNEY April 13, 1954

H. J. NICHOLS 2,675,084

CONTROLLABLE REVERSIBLE PITCH PROPELLER

Filed Aug. 26, 1947

INVENTOR
HARRY J. NICHOLS,
BY
ATTORNEY

Patented Apr. 13, 1954

2,675,084

UNITED STATES PATENT OFFICE 2,675,084

CONTROLLABLE REVERSIBLE PITCH PROPELLER

Harry J. Nichols, Point Pleasant, N. J.

Application August 26, 1947, Serial No. 770,640

9 Claims. (Cl. 170—160.35)

This invention relates to controllable reversible pitch propellers and more particularly to such propellers for use with marine vessels, and has for its main object the provision of a propeller of the character described in which the pitch of the blades can be readily and accurately adjusted, and also reversed, while the propeller is in rotation under load.

Another object is to provide an exceptionally simple, compact, powerful and durable pitch changing mechanism which is economical to manufacture and easy to install, and the moving parts of which can be readily re-conditioned or replaced in event of wear or damage by accident.

Another object is to provide an exceptionally powerful and rugged blade turning movement characterized by a large mechanical advantage adapted to be housed entirely within a propeller hub of relatively small diameter which will have a minimum of working parts, which can apply a powerful torque-couple to each blade, and which will hold and lock the blades rigidly, thereby avoiding any possibility of flutter or vibration of the blades in operation due to excessive back-lash or elasticity, or angular displacement of the blades by the working load reaction.

A further object is to provide a controllable reversible pitch propeller organization particularly adapted for the replacement of fixed blade propellers already installed for purposes of modernization without requiring any substantial alteration of the existing propulsion arrangements, or any increase in the normal diameter of the propeller shaft or hub.

A further major object is to provide a coordinated combination of a mechanical movement in the hub and of actuating mechanism in a unitary shaft coupling within the vessel, whereby pitch changing torque derived from a power source external to the shaft is greatly amplified by the mechanism in the coupling, such amplified torque is transmitted by a rotary shaft to the movement in the hub, and that movement further greatly amplifies such torque for purposes of turning the blades so as to vary their pitch.

With these and other objects in view, as well as other advantages incident to the improved construction, the invention consists in various novel features and combinations thereof set forth in the claims with the understanding that the several necessary elements constituting the same may be varied in proportion and arrangement without departing from the nature and scope of the invention as defined in the appended claims.

To enable others skilled in the art to comprehend the underlying features of this invention that they may embody the same by suitable modifications in structure and relation to meet the various practical applications contemplated by the invention, drawings showing a preferred embodiment of the invention form part of this disclosure, and in such drawings like characters of reference denote corresponding parts in the several views in which:

Fig. 1 is a side elevation in half-axial section of a marine propeller hub and blade assembly according to the invention.

Fig. 2 is a transverse half-sectional view of the assembly shown in Fig. 1, the section being taken at the mid plane 2 thereof.

Figs. 3 and 4 are detail views of the novel combined nut-and-wedge element shown in the prior figures.

Figure 8:
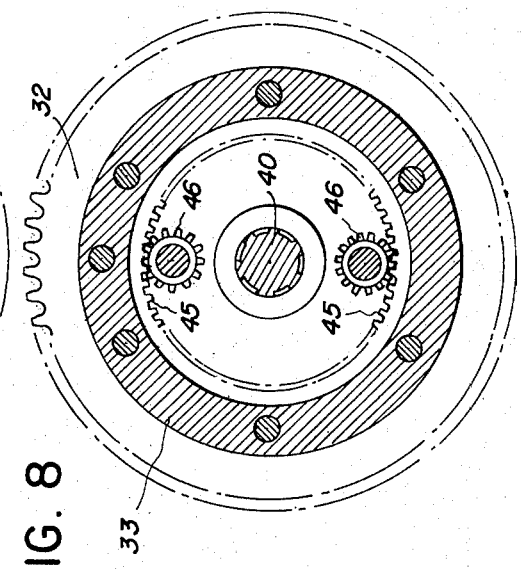
Figure 5:
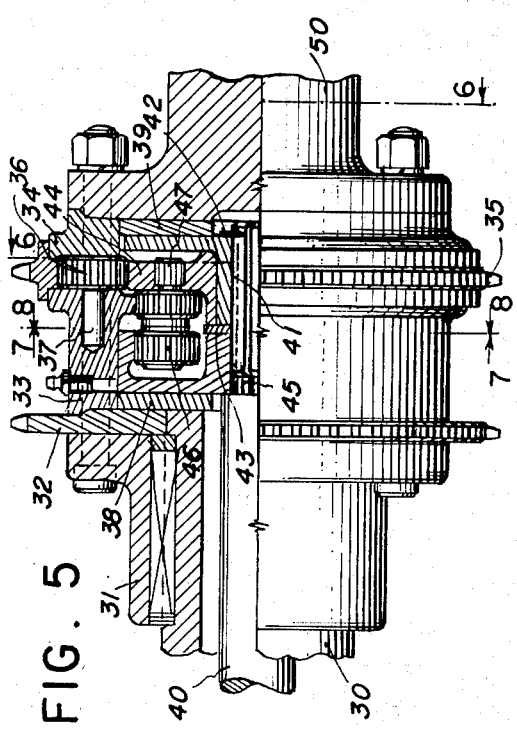
Fig. 5 is a side elevation in half axial section of the novel shaft coupling assembly according to the invention.
Figure 7:
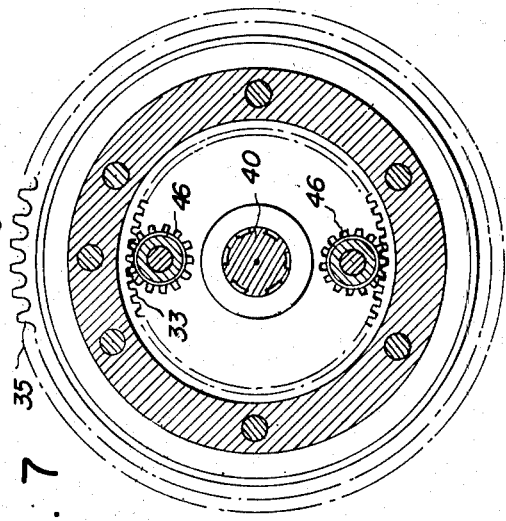

Figs. 7 and 8 are transverse sectional views of Fig. 5 taken substantially on the mid plane as viewed from the directions indicated by numerals 7—7 and 8—8 respectively.

General description

Considered as a whole, and referring generally to the drawings, the construction of the invention constitutes a coordinated variable pitch propeller organization comprising three sections, namely: a propeller hub and blade assembly as shown in Fig. 1, which is located outside the vessel in practice and includes a novel mechanical movement housed within the propeller hub for turning the propeller blades axially in unison to vary their pitch; a novel shaft coupling assembly adapted for connection to the drive shaft as shown in Fig. 5, which is located within the vessel in practice and includes power driven torque multiplying gearing housed therein; and an intermediate section consisting of a tubular propeller shaft which drivingly connects the shaft coupling assembly to the propeller hub, and a rotary screw shaft mounted coaxially in the bore of the propeller shaft which operatively connects the gearing in the shaft coupling assembly to the blade turning mechanism in the hub assembly.

Hub assembly

Referring now to the drawings in detail and particularly to Figs. 1 and 2, the hub and blade assembly of the invention, which is of water tight construction, is shown by way of example as including a hollow one-piece hub 10 secured tightly to the outboard end of propeller shaft 30 by means of cap screws 11 extending longitudinally through an upset flange formed on the outboard end of the propeller shaft into threaded holes in the hub, but it can be secured thereto by body-bound stud bolts and nuts in conventional manner if so desired. The hub is formed with stepped radial blade sockets and a cylindrical axial bore extending from the inboard end.

The hub is shown as being provided with a hemi-spherical fairwater hub cap 12 adapted to be secured tightly thereto by cap screws 13, the joint therebetween being sealed by a ring gasket 14. It is to be noted however, that the hub cap can be cast integral with the hub. In practice the hub cap would usually be longer and of better streamline form than the abbreviated form shown. The practical object of the construction illustrated is that various forms of light fairwater hub caps can be readily fitted, but in the event the hub cap is loosened or dislodged by accident, water will not have access to the interior of the hub.

Radial propeller blades 20, each having a circular boss and a cylindrical concentric root as shown, are rotatably secured in the radial sockets of the hub by a blade mounting assembly which also provides an externally sealed combination two-way thrust and radial bearing. The parts of the blade mounting assembly, considered in the order and manner of assembly, are as follows: A blade spindle or journal 21, having an axial bore adapted to fit the blade root and a radial thrust flange at the base is provided with two diametral crank pins 22 extending from the outer face of said flange, the crank pin circle of course being concentric with the axis of rotation of the blade. These crank pins are shown provided with loose sleeve rollers 23 which for purposes of assembly can be retained on the crank pins by a coating of grease. Slipper blocks fitted to the crank pins and grooves may be used in lieu of the rollers shown. Blade journal 21 is also preferably provided with an inner thrust washer 24 fit to the inner face of the flange of the collar as shown, the thrust washer preferably being cemented to the thrust flange to prevent relative movement therebetween. Inner thrust bearing ring 18 is then dropped over the blade journal into position against inner thrust washer 24. The collar with the assembled parts is then placed in the blade socket with the crank pins engaged in the oppositely inclined grooves of cam 27, described in detail hereinafter, as shown. Beveled retainer ring 19, of well-known commercial type, is next sprung into closed position and inserted in the blade socket and allowed to spring out into the annular groove cut in the bore of the blade socket, as shown.

The retainer ring thus locks inner thrust bearing ring 18 in place against the shoulder provided for it in the blade socket. Radial sleeve bearing 16 having sleeve liner 17 tightly cemented in the inside of its bore is then placed in position over the blade journal and seated against the shoulder provided for it in the blade socket. The purpose of the cement is of course to hold the sleeve liner tightly to the sleeve bearing so that the blade journal will turn in the sleeve liner. The sleeve bearing also serves to lock retainer ring 19 in place.

Resilient metallic sealing ring 15, which has an arched section and cupped oversize rim, is then pushed into the hub socket, the cupped rim of this ring being a tight spring fit to provide a rim seal with the bore of the hub socket, and to prevent rotation of the ring.

Outer thrust washer 25 is next cemented to the circular seat provided for it on the blade boss to provide a seal therewith and prevent relative movement therebetween. The blade root is then entered into the bore of the blade journal, the bolt holes in the blade boss being properly registered with the threaded holes in the blade journal. The blade 20 is then secured to the blade journal by cap screws 26. When the latter are tightened, the arched middle portion of sealing ring 15 is compressed tightly against outer thrust washer 25, thus preloading both thrust bearings and also providing a tight seal between the two outer thrust bearing surfaces. The bolt holes in the blade boss are then sealed and filled flush with soft solder in the conventional manner.

The interior of the hub is preferably provided with a supply of lubricant, such as heavy oil or light grease, for the purpose of lubricating the working parts. It is to be understood that the two thrust washers and the sleeve liner merely provide renewable bearing surfaces, and can be omitted from construction intended for light duty only.

Each blade mounting is thus sealed by a combination metallic seal and outboard thrust bearing. The vital element of this combination is the resilient metallic sealing cup 15—preferably formed from a thin sheet of non-corrosive metal—which has an outwardly springing lip and an arched-spring web section. By thus combining the spring seal element with the outboard thrust bearing, the thrust bearing can be preloaded to eliminate any wobble or shake of the blades and to provide take-up for wear, while keeping the starting friction under load to a minimum. Moreover, the preloaded resilient sealing ring has the effect of distributing the thrust bearing pressure due to the tilting force of the blade thrust on the blade. This spring loaded, combination outboard seal and thrust bearing is thus an important practical feature of the blade mounting construction of the invention.

It is to be noted that the bearing surfaces between the resilient sealing ring 15 and the outer thrust washer 25 are lubricated in operation on the outer margin by water, and on the inner margin by grease or oil. Hence the need of a combination of materials for these parts which is especially adapted for such lubricating conditions. Moreover, the combination of materials should be such that the thrust washer is softer than the sealing ring and will not score the latter. A Monel sealing ring of hard temper and a laminated phenolic or other suitable plastic thrust washer meets these requirements. Moreover, any reasonable wear on the plastic thrust washer will be compensated for by the spring effect of the sealing ring, hence will not result in leakage.

*Blade turning movement*

The blades are turned axially in unison in their sockets to change the pitch by a novel mechanical movement of unusual compactness and ruggedness which combines essentially the principles of two basic elementary pairs; namely, a closed pair consisting of a screw and nut, and an open pair consisting of a positive motion sliding cam and follower. In this movement, the cam is provided with a pair of conjugate grooves which swing a pair of diametral crank pins as followers. The novel element of this movement is an axially slidable combined nut-and-cam 27, herein termed the cam, having the general form of a regular right prism and having on each face oppositely inclined conjugate grooves into which two diametral crank pins 22 fixed to each blade journal extend and are forced to swing about their axis as followers upon translation of the cam, thereby to turn the blades axially in unison. Cam 27 is translated in operation by axial screw shaft 40 threaded rotatably therein as shown, this pair thus constituting a screw-jack.

The crank pins are provided with roller sleeves 23 as before stated to reduce friction and distribute the wear, in the well known manner of roller chains. The crank pins are preferably provided with knurled roots adapted to be forced tightly in holes in the outer face of the flange of the blade journal, and are notched to break off clean in case of an excessive blow to the blade in event of striking an obstruction. This is a safety feature to minimize damage to the mechanism in case of accident to the propeller. After such accident, the crank pins, if damaged, can be readily replaced.

Cam 27, shown in detail in Figs. 3 and 4, is of prismatic form and has a cross section bounded by a circumference adapted to fit closely inside the axial bore of the hub and sides adapted to fit closely between the inner faces of the blade journals (see Fig. 2.). Thus for a three-bladed propeller, as shown, the cross section of the cam is a triangle with rounded corners, as shown in Fig. 4; while for a four-bladed propeller, the cross section would be a square with rounded corners. The diameter of the circumference is only slightly less than the diameter of the axial bore in the hub, so as to be sliding fit therein, thus avoiding any possibility of transverse wedging action against the blade journals. Cam 27 has an axial bore screw-threaded in the middle portion and adapted to mate loosely with corresponding threads on screw shaft 40; the shaft and nut in combination constituting a screw and nut pair. Preferably the screw threads are of Acme form of self-centering type.

Each lateral face of cam 27 is provided with oppositely inclined trochoidal cam grooves as shown in detail in Fig. 3. These wedge-grooves are symmetrically disposed with respect to the center line of the cam as shown, and have a curvature such that the angular displacement of the crank pins is proportional to the travel of the cam, thereby enabling the scale of the pitch indicating instrument to have uniform graduations. The cam grooves, of course, have a width and depth adapted to fit the crank pin rollers 23.

The pitch line and contours of the curves of the grooves, which must be conjugate curves, can be determined in any specified case in the following manner: Draw in, as in Fig. 3, the crank pin circle and outline of the crank pin rollers, taking the intersection of the cam axis and wedge center line as the origin, are indicated. The coordinates of the pitch lines of the conjugate grooves with respect to the specified origin and axes are defined by the parametric equations:

(1) $x = t \pm r \cos \theta$
(2) $y = r \sin \theta$
(3) $t = rm\theta$ (in the case of trochoidal grooves)

where $x$ = abscissas along cam axis
$y$ = ordinates perpendicular to cam axis
$r$ = radius of crank pin circle
$\theta$ = crank pin angle from mid position
$t$ = axial travel of cam
$m$ = modulus The modulus $m$ depends on the crank pin angle at which $x=0$, that is, the maximum desired crank pin angle.

As an example, assume that $\theta$ (max.) $= 30° = .5236$ radian when $x=0$, as in Fig. 3; then from Equation 1:

(4) $$m = \frac{\cos \theta}{\theta} = \frac{\cos 30°}{.5236} = \frac{.8660}{.5236} = 1.655$$

By Equation 3, the maximum permissible wedge travel is (5) $T = rm\theta = 1.655 \times .5236 \times r = .8660r = r \cos \theta$ (max.)

By differentiating Equations 1 to 3 inclusive, we have the differential equations:

(6) $$\frac{dx}{d\theta} = rm - r \sin \theta$$

(7) $$\frac{dy}{d\theta} = r \cos \theta$$

(8) $$\frac{dt}{d\theta} = rm = \text{constant}$$

Equation 8 indicates that the crank angle will be proportional to the axial travel of the cam, as desired.

The slope of the curve at any point can be found from the well known formula:

(9) $S = \tan' \frac{dy}{dx} = \tan' \frac{\cos \theta}{m - \sin \theta}$ (Eq. 7/Eq. 6)

To find the slope at zero crank angle for the conditions of the example, let $\theta = 0$, whence (9) becomes:

(10) $$S_o = \tan' \frac{1}{1.655 - 0} = \tan' .6040 = 31° \text{ approx.}$$

At the extremes of travel $\theta = \pm 30°$, whence the corresponding slopes are

(11) $$+S = \tan' \frac{.8660}{1.655 - .500} = \tan' .750 = 37° \text{ approx.}$$

(12) $$-S = \tan' \frac{.8660}{1.655 + .500} = \tan' .400 = 22° \text{ approx.}$$

It should be noted that the average of the above extreme slopes is 29.5°, while the slope at mid crank position is 31°. Hence the variation in the mechanical advantage as the crank angle changes is negligible. It should be further noted that a line connecting any two points on the pitch lines representing the same crank pin angle must always have a length of $2r$, and its center must lie on the horizontal axis $x—x$. The contours of the grooves are of course the envelopes of the tangents to the circles representing the successive positions of the crank pin rollers. The novel mechanical movement described applies a torque couple to turn each blade axially, thereby eliminating the radial load component which would be produced by the turning effort if only a single crank pin were used. Further, since the turning effort is exerted on two crank pins instead of one, the crank pins can be made proportionally smaller, yet provided adequate strength. The movement also provides a substantial mechanical advantage in turning the blades, according to the well-known inclined plane principle, thereby reducing the working force necessary to slide the cam against the load reaction. The overall mechanical advantage is the product of the individual mechanical advantages of the twin crank-pins, wedge, and screw-jack. As a direct consequence, the screw shaft 40 or its equivalent can be relatively much smaller than would otherwise be necessary. Furthermore, the movement provides a rigid mechanical connection to the blades which can be fit in practice with virtually no back-lash, thus avoiding the possibility of shake and consequent blade vibrations and locking the blades against angular displacement by the load reaction. Moreover, the cam is slidingly supported so that it cannot turn in the bore, hence no separate guide means are necessary. It is thus thought evident that the novel blade turning movement of the invention provides outstanding advantages in itself and in combination with other features of the construction.

Shaft coupling assembly

Referring now to Fig. 5 which shows the novel shaft coupling assembly of the invention, this assembly serves to connect drive shaft 50 in driving relation to propeller shaft 30 and also carries torque multiplying gearing for driving screw shaft 40. Drive shaft 50, as for example an engine shaft, is shown as being provided with a conventional upset flange; while propeller shaft 30 is preferably provided with a keyed, demountable flange 31, of conventional type, thus to enable the propeller shaft to be withdrawn outboard through the propeller shaft bearings (not shown) in accordance with common practice. The demountable flange assembly preferably includes a circular locking plate 32, having an extended rim provided with sprocket teeth for purposes to be described hereinafter.

Two hollow coupling members, namely stationary gear ring 33 having internal teeth and spacer ring 34, are provided to hold the two flanges spaced apart so as to accommodate the mechanism of the shaft coupling assembly, and also to transmit driving torque from the drive shaft to the propeller shaft. The coupling parts just named are strongly clamped together by plural body-bound through-bolts in conventional manner as shown.

Figure 6:
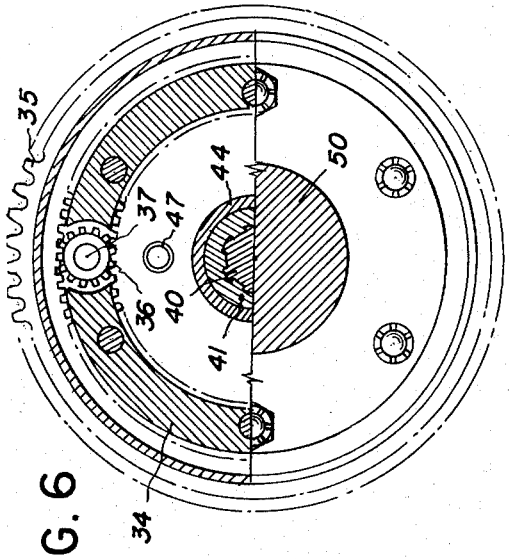
Fig. 6 is a right end view with a half section taken substantially on the plane indicated by numeral 6 of Fig. 5.

The gearing for driving screw shaft 40 is carried by and housed entirely within the coupling members 33, 34 and comprises the following construction, constituting torque transmission gearing and torque amplifying gearing connected in series. A combined sprocket and ring gear 35, herein termed a sprocket gear, having sprocket teeth on the external periphery and gear teeth on the internal periphery, is rotatably mounted in an annular groove formed in the adjacent ends of gear ring 33 and spacer ring 34, as shown. (A roller chain and motor, not shown, are provided in practice for driving sprocket gear 35.) Idler pinions 36 are mounted in circular recesses formed in the coupling rings (see Fig. 6), so as to turn on pin pivots 37 mounted as studs in gear ring 33 and in meshing engagement with the internal gear of sprocket gear 35 and sun gear 44. Sprocket gear 35, idler pinions 36, and sun gear 44 thus constitute the torque transmission gearing.

Mounted fixed on screw shaft 40 is an assembly of parts comprising flanged thrust collar 41 and internal orbit gear 45, each having internally splined hubs mating with the reduced splined end of screw shaft 40, these parts being held against axial displacement by retainer ring 42 locking in an annular groove near the inboard end of the shaft as shown. A shim washer 43 is located between the hubs of the thrust collar and orbit gear for purposes of axial adjustment of these parts.

Thrust washers 38, 39 are mounted between the web of orbit gear 45 and the demountable flange assembly; and between the flange of thrust collar 41 and the face of the drive shaft flange, respectively, thus to provide renewable thrust bearing surfaces. These thrust washers are preferably of anti-friction material adapted to withstand heavy pressure without scoring, and are preferably cemented to the adjacent stationary surfaces. The orbit gear, thrust collar, and thrust washers in combination with the adjacent structure thus contitute a two-way thrust bearing adapted to withstand the axial thrust of screw shaft 40, while reducing the friction between the moving and stationary parts during operation. The outer perimeter of orbit gear 45 is adapted to turn as a journal in the bore of gear ring 33 and thus serves as a steady bearing for the inboard end of the screw shaft. Screw shaft 40 may be provided with one or more intermediate steady bearings (not shown) in the bore of the propeller shaft.

It should be noted that screw shaft 40 does not extend into the drive shaft, which latter may therefore be solid. Further, that no extra machine work need be done on the drive shaft or its flange which shaft can be used with the shaft coupling described without alteration.

A sun gear 44 is mounted loose on the hub of thrust collar 41 and is provided with external gear teeth adapted to mesh with the teeth of idler pinions 36. (See Fig. 6.) Sun gear 44 also carries plural double planet-pinions 46 adapted to mesh in common with the internal gears of gear ring 33 and orbit gear 45, each pinion turning on a planet pivot 47 mounted as a stud in the web of the sun gear, the latter thus constituting a planet carrier or epicyclic arm.

Referring now to Figs. 7 and 8, the driving planet carrier 44, the double planet-pinions 46, the fixed internal gear of gear ring 33, and the driving internal orbit gear 45 in combination provide speed reduction gearing of planetary differential spur gear type capable of greatly multiplying the driving torque for purposes of turning screw shaft 40. The proper degree of torque gain will in practice depend upon the speed of the drive shaft, and other variable factors. The double planet-pinions may have an equal number of teeth, in which case they constitute idler pinions, or a different number of teeth, as shown, in which case they constitute compound pinions. The fixed internal gear and the driven orbit gear will, however, always have a slightly different number of teeth, depending upon the torque gain desired and the number of teeth in the planet pinions, if compounded. As is well established, planetary differential speed reduction gearing of the character shown and described is capable of providing a wide range of reduction ratios merely by choice of the number of teeth in the various gears, without necessarily changing the size of the gears to any considerable extent. The planetary differential gearing thus constitutes the torque amplifying gearing.

Operation

The operating principle of the pitch changing mechanism described above is as follows: The pitch can be changed either when the drive and propeller shafts are stopped, or when in rotation under load. Assuming the first case, which is the simplest, with all parts at rest and the reversible driving motor (not shown) stopped, power would be applied to energize the motor to turn in one direction or the other and by means of the drive chain (not shown) sprocket gear 35 would be driven in the same direction as the motor. As may be seen from Fig. 6, rotation of sprocket gear 35 will turn idler pinions 36 to drive sun gear 44 in the opposite direction. Sun gear 44, acting as the driving planet carrier of the planetary gearing, will cause planet pinions 46 to roll around in fixed internal gear 33 and orbit gear 45, causing the latter to be displaced angularly with respect to the fixed gear, at a relatively slow rate, because of the differential gear action resulting from the difference in the number of teeth in these gears (compounded by the planet pinions if these be compound). The rotation of orbit gear 45 with respect to sun gear 44 may be in one direction or the other depending on the algebraic sign of the differential gear train, the relative rotation being immaterial in practice since the reversible motor can run equally well in either direction. The torque gain ratio of the planetary gear train shown will be almost as great as the speed reduction ratio, due to the high efficiency of the type of gearing employed. Thus the motor torque is greatly multiplied for application to rotate orbit gear 45 and screw shaft 40 which is fixed thereto.

Rotation of screw shaft 40 in cam 27 produces axial translation of the latter, the resulting thrust on the screw shaft being taken up by the thrust bearing members in the shaft coupling, as previously described. Thus the screw shaft, cam and thrust bearing in combination constitute a form of screw-jack, which can be designed to provide a large mechanical advantage. Translation of cam 27 causes a torque couple to be applied via the associated pairs of crank pins in such manner as to turn the blades axially in unison, thereby to vary their pitch.

If the reversible motor were energized to run in the reverse direction, the sequence of operations would be the same, except that the pitch change would also be reversed.

Assuming next the case of pitch changing with the propeller shaft in rotation under load, the parts shown would normally be in rotation bodily with the shaft, but would be stationary with respect to each other. (However, the sprocket gear 35 would drive the drive chain and thereby the reversible motor at a fractional idling speed.) If the motor were then energized as before, the sequence of operations would be the same as in the first case, but the rate of operation would be materially altered, depending upon the relative rate and direction of rotation of the motor and propeller shaft. By way of explanation, let it be assumed that at normal propeller shaft speed, the motor is driven by the propeller shaft at an idling speed of one-half the forward full-power running speed. Then when the motor is energized to deliver full forward power, its relative speed would be only one-half the relative speed obtainable when the propeller shaft is stopped as in the first case. But when the motor is energized to produce full reverse power, the relative speed obtainable would be one and one-half times that obtainable when the propeller shaft is stopped as in the first case. There will also be a further modification of the rate of pitch change due to planetary gear action produced by the rotation of the propeller shaft.

In practice, the motor speed and speed-reduction ratios are so chosen that when the propeller shaft is running at normal speed, the pitch can be changed from full-forward to full-reverse in some specified interval, say five seconds. This of course represents the pitch change of greatest urgency in event of imminent collision ahead. The pitch change from full reverse to full ahead will then require a longer interval, say three or four times as long as the pitch reversing interval. This is usually fully acceptable in practice, since there is normally no emergency situation requiring full, rapid change in the pitch from reverse to forward.

Pitch indication

It should be noticed that the pitch changing mechanism described constitutes a positive kinematic chain in which the change of blade pitch produced is directly proportional in greatly reduced ratio to the angular displacement of sprocket gear 35 with respect to propeller shaft 30. The mechanism as a whole thus constitutes in effect a form of micrometer wherein the change of pitch can be measured by measuring the relative angular displacement of sprocket gear 35.

Means are provided in connection with the novel shaft coupling of the invention for measuring the angular displacement of sprocket gear 35 relative to the propeller shaft for subsequent pitch indication purposes. This means includes the sprocket teeth on locking plate 32 (or like sprocket teeth carried by gear ring 33) which sprocket teeth are preferably of the same pitch and pitch diameter as the sprocket teeth of sprocket gear 35, the latter also being included in the said means. The two sprockets can be employed to actuate jointly a differential angle measuring device, or equivalent, for producing pitch indications in a known manner by means of known devices and instruments. Such known devices and pitch indicating instruments suitable for use in connection with the present invention are shown, for example, in my copending application Ser. No. 504,333 filed September 29, 1943.

It is thus evident that the propeller organization of the invention provides an advantageous cooperative coordination of its various parts. By reason of the novel wedge and double-crank pin movement, the load on the blade bearings is minimized, and only a fraction of the blade turning reaction under load is transmitted to the screw shaft. Accordingly, the diameter of the screw shaft can be reduced and the bearing surfaces in the hub and shaft coupling assemblies can be made relatively smaller without exceeding the limits of good practice. The screw jack movement in the hub relieves the gearing of load except during pitch change, and minimizes the load during pitch change. Hence relatively light gear members can be employed in the transmission and planetary gearing. These factors enable the shaft coupling assembly to be made exceptionally compact.

Without further discussion, it is thought evident that the mechanism of the invention provides an exceptionally simple, compact, powerful and efficient means for varying and reversing the blade pitch under all operating conditions.

well adapted to accomplish in practice the manifold objects of the invention.

I claim as my invention:

1. A variable pitch marine propeller of the type having a tubular propeller shaft, a drive shaft, and a mechanical shaft coupling assembly therebetween for drivingly connecting said shafts, and having, in combination; a hub assembly fixed to said propeller shaft including a hollow hub and radial blades mounted rotatable about their axes thereon, and a mechanical movement mounted within said hub for turning said blades axially in unison comprising an axially slidable prismatic cam element mounted coaxially within said hub and two diametral crank pins fixed to each of said blades so as to turn said blades axially upon axial translation of said cam element and a screw-jack mechanism in which said cam element constitutes the nut element for translating said cam axially; an operating shaft mounted coaxially and rotatably in said propeller shaft and constituting the screw element of said screw-jack mechanism; and power driven mechanism carried bodily by said coupling assembly including differential planetary gearing operatively connected to said operating shaft for deriving upon application of driving torque thereto greatly amplified torque for turning said operating shaft, thereby to actuate said screw-jack mechanism and said mechanical movement.

2. In a variable pitch marine propeller including a tubular propeller shaft, a driving shaft therefor, and a mechanical coupling assembly for drivingly connecting said shafts, in combination, a hollow hub fast to the outboard end of said propeller shaft, radial blades each having a journal with a flange provided with a pair of diametral crank pins journaled in said hub, mechanism housed within said hub for applying a torque couple to each of said journals including an axially slidable prismatic cam operatively connected in common to said pairs of crank pins, screw-jack mechanism for translating said cam axially including said wedge and a rotatable jack-screw mounted coaxially in said propeller shaft, and power means carried by said mechanical coupling assembly for turning said jack-screw including gearing for transmitting driving torque and planetary differential gearing capable of greatly multiplying said driving torque for purposes of turning said jack-screw.

3. In a variable pitch marine propeller construction including a drive shaft and a propeller shaft in axial alignment, in combination, a hollow mechanical coupling assembly for drivingly connecting said drive shaft to said propeller shaft, a rotary shaft mounted coaxially of and extending through said propeller shaft into said coupling assembly, speed reducing gearing mounted in said coupling assembly around said rotary shaft including planetary differential gearing characterized by a high torque-gain for applying turning torque to said shaft, and thrust-bearing means adapted to support any thrust of said shaft housed within said coupling assembly.

4. In a variable pitch propeller, the combination of a tubular propeller shaft, a drive shaft therefor, a mechanical coupling assembly adapted to drivingly connect said shafts, an operating shaft rotatably mounted coaxially in said propeller shaft and extending into said coupling assembly, and an assembly of gearing for turning said operating shaft carried by said coupling assembly comprising a rotatable combination sprocket-and-internal ring-gear, a combination planet-carrier and sun-gear rotatably mounted on and coaxially with respect to said operating shaft, idler pinions meshing with the aforesaid gears, and planetary differential gearing for driving said operating shaft upon rotation of said sun gear comprising a fixed internal-gear fast coaxially to said coupling assembly, a driven orbit-gear fast coaxially on said operating shaft, and double planet-pinions carried by said sun-gear and meshing with said fixed internal-gear and said orbit-gear.

5. In a mechanical operating device for a variable pitch marine propeller, including a hollow coupling assembly for connecting a drive shaft in driving relation to a tubular propeller shaft and a rotatable operating shaft mounted coaxially in said propeller shaft and said coupling assembly, mechanism carried by and within said coupling assembly for rotating said operating shaft comprising, in combination, a rotary sprocket member mounted on said coupling assembly, a torque transmitting spur gear train driven by said sprocket member, and gear means for multiplying greatly the torque transmitted by said torque transmitting gear train so as to rotate said operating shaft when under load comprising, planetary differential spur gearing characterized by a high torque gain operatively connecting said torque transmitting gear train to said operating shaft, said differential gearing including a fixed internal gear fast to or integral with said coupling assembly, a driven orbit gear coaxially mounted fast on said operating shaft, said internal gear and said orbit having a differential member of teeth, and a combination sun-gear and planet-carrier coaxially mounted loose on said operating shaft and carrying double planet-pinions adapted to mesh jointly with said fixed internal gear and said orbit gear, said combination sun-gear and planet-carrier also constituting the driven member of said torque transmitting gear train and the driving member of said differential gearing.

6. In a variable pitch propeller including a plurality of axially rotatable blades, a mechanical coupling assembly for connecting a tubular propeller shaft carrying means for varying the pitch of the propeller blades to a drive shaft in axial alignment therewith, and having in combination, a hollow coupling structure provided with means for connecting said shafts in driving relation, a rotatable operating shaft for operating said means for varying the pitch of the blades mounted coaxially and rotatably in said propeller shaft and said coupling structure; and driving means for rotating said operating shaft including gear means for transmitting driving torque derived from a power source external to said coupling assembly, and planetary differential gearing mounted within said coupling structure and coaxially on said rotatable shaft for multiplying said driving torque greatly and applying such multiplied torque to rotate said operating shaft.

7. The combination of claim 6 and a two-way thrust bearing assembly adapted to support the thrust of said operating shaft mounted within said coupling structure.

8. A controllable pitch marine propeller assemblage comprising, in combination, a tubular propeller shaft; a hub fixed to the outboard end of said shaft and having an axial bore and radially disposed blade sockets; radial propeller blades; blade mounting means for securing said blades in said sockets for angular displacement about their axes for pitch changing, said means including a circular boss on each blade adjacent its root end, and a blade journal supported for rotation in bearings in each said socket, said blade boss being affixed to its associated blade journal and said blade journal being locked to the hub; said blade journals each having a radial thrust flange at its inner end and a pair of diametral crank pins carried by each said flange and projecting into said bore; a combined nut-and-cam element mounted for translation only coaxially in said bore, said element having an axial screw-threaded bore and flat faces, one for each blade, each provided with a pair of oppositely inclined trochoidal conjugate grooves engaging operatively with a pair of said crank pins, thereby to apply a torque couple to said blades by means of said crank pins upon axial translation of said element; and a rotatable screw shaft for translating said element mounted coaxially in said propeller shaft for rotation relative thereto and having complementary screw threads mating in said threaded bore; whereby upon rotation of said screw shaft said element is translated therealong, said grooves apply a torque couple to each pair of crank pins, the torque transmitted by said screw shaft is greatly multiplied upon application to said blades and said blades are angularly displaced in unison in direct proportion to the rotation of said screw shaft.

9. A controllable pitch marine propeller assemblage comprising, in combination, a tubular propeller shaft; a hub fixed to the outboard end of said shaft and having an axial bore and radially disposed blade sockets; radial propeller blades; blade mounting means for securing said blades in said sockets for angular displacement about their axes for pitch changing, said means including a cylindrical concentric root on the inner end of each blade, a blade journal supported for rotation in bearings in each said socket, said blade journal having an axial bore for receiving the root of the associated blade, said blade being rigidly affixed to its associated blade journal and said blade journal being locked to the hub, and means providing a seal for sealing said blade journal and its bearings in said socket; said blade journals each having a radial thrust flange at its inner end and a pair of diametral crank pins carried by each said flange and projecting into said bore; a combined nut-and-cam element mounted for translation only coaxially in said bore, said element having an axial screw-threaded bore and flat faces, one for each blade, each provided with a pair of oppositely inclined trochoidal conjugate grooves engaging operatively with a pair of said crank pins, thereby to apply a torque couple to said blades by means of said crank pins upon axial translation of said element; and a rotatable screw shaft for translating said element mounted coaxially in said propeller shaft for rotation relative thereto and having complementary screw threads mating in said threaded bore; whereby upon rotation of said screw shaft said element is translated therealong, said grooves apply a torque couple to each pair of crank pins, the torque transmitted by said screw shaft is greatly multiplied upon application to said blades and said blades are angularly displaced in unison in direct proportion to the rotation of said screw shaft.

References Cited in the file of this patent

UNITED STATES PATENTS

| Number | Name | Date |
| --- | --- | --- |
| 1,190,328 | Sacerdoti | July 11, 1916 |
| 1,510,436 | Englesson | Sept. 30, 1924 |
| 1,633,824 | Niedergessaess | June 28, 1927 |
| 1,656,019 | Roberts | Jan. 10, 1928 |
| 1,668,408 | Johnson | May 1, 1928 |
| 1,877,048 | Popp | Sept. 13, 1932 |
| 1,890,932 | Briner | Dec. 13, 1932 |
| 1,967,302 | Gannett | July 24, 1934 |
| 2,054,810 | Gaba | Sept. 22, 1936 |
| 2,481,032 | Mount et al. | Sept. 6, 1949 |
| 2,501,617 | Roesch | Mar. 21, 1950 |

FOREIGN PATENTS

| Number | Country | Date |
| --- | --- | --- |
| 760 | Great Britain | Jan. 11, 1907 |
| 7,666 | Sweden | of 1896 |

OTHER REFERENCES

Standell: "Controllable Pitch Propellers" from American Society of Naval Engineers Journal, volume 52, 1940.
volume 52, 1940.